(12) United States Patent
Messina et al.

(10) Patent No.: US 7,224,935 B2
(45) Date of Patent: May 29, 2007

(54) TELEMATICS APPLICATION FOR IMPLEMENTATION IN CONJUNCTION WITH A SATELLITE BROADCAST DELIVERY SYSTEM

(75) Inventors: Andrew Albert Messina, Taylor, MI (US); Jack Harold King, Howell, MI (US); Michael Chrysochoos, Toledo, OH (US); Philip Mark Bator, Farmington, MI (US); Richard Zerod, Livonia, MI (US); Taras O. Fedak, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 942 days.

(21) Appl. No.: 09/727,099

(22) Filed: Nov. 29, 2000

(65) Prior Publication Data

US 2002/0065037 A1 May 30, 2002

(51) Int. Cl.
 *H04H 1/00* (2006.01)
(52) U.S. Cl. ............... 455/3.02; 455/3.04; 455/3.06; 455/12.1; 701/13; 701/36
(58) Field of Classification Search ............... 455/3.01, 455/3.02, 3.04, 3.06, 12.1, 426.1, 426.2, 455/574.1; 701/1, 13, 24, 25, 26, 28, 36, 701/44, 45, 120, 200, 201
See application file for complete search history.

(56) References Cited

U.S. PATENT DOCUMENTS

| 5,303,393 A | 4/1994 | Noreen et al. |
| 5,455,823 A | 10/1995 | Noreen et al. |
| 5,613,190 A | 3/1997 | Hylton |
| 5,689,245 A | 11/1997 | Noreen et al. |
| 5,793,413 A | 8/1998 | Hylton et al. |
| 5,797,101 A * | 8/1998 | Osmani et al. ............. 455/551 |
| 5,812,930 A | 9/1998 | Zavrel |
| 5,892,535 A | 4/1999 | Allen et al. |
| 5,959,577 A | 9/1999 | Fan et al. |
| 5,978,855 A | 11/1999 | Metz et al. |
| 6,049,721 A | 4/2000 | Serizawa et al. |
| 6,282,491 B1 | 8/2001 | Bochmann et al. |
| 6,725,022 B1 * | 4/2004 | Clayton et al. .......... 455/154.1 |
| 2002/0072955 A1 * | 6/2002 | Brock ........................ 705/10 |

FOREIGN PATENT DOCUMENTS

| DE | 198 59 645 A1 | 6/2000 |
| EP | 0 926 020 A2 | 6/1999 |
| EP | 1 000 826 A2 | 5/2000 |
| EP | 1 037 187 A2 | 9/2000 |

(Continued)

OTHER PUBLICATIONS

Nov. 28, 2000 issue of Autobeat Daily, pp. 1-3.

(Continued)

*Primary Examiner*—Edan Orgad
(74) *Attorney, Agent, or Firm*—Brinks Hofer Gilson & Lione

(57) ABSTRACT

A method of showing approval or disapproval of an item overheard on an audio system. The method includes sending an item via radio waves to an audio system, listening to the item on the audio system and activating a button to indicate approval or disapproval of the item.

18 Claims, 4 Drawing Sheets

FOREIGN PATENT DOCUMENTS

| | | |
|---|---|---|
| WO | WO 98/15075 A2 | 4/1998 |
| WO | WO 00/13036 A1 | 3/2000 |

OTHER PUBLICATIONS

Web Page of Interactive Week of ZDNet located at http://www.zdnet.com/intweek/stories/news/0,4164,2657306,00.html as of Nov. 28, 2000, pp. 1-4.

Ajluni, C., "ITS: The Bridge to an Intermodal Society," Electronic Design, vol. 43, Oct. 2, 1995, pp. 85, 86, 88, 90, 92, 94, 95.

Ibenthal, A. et al., "Multimedia im Farhzeug: Dienste und Technologie," ITG Fachberichte, VDE Berlag, Berlin, Germany, vol. 156, Sep. 27, 1999, pp. 43-52.

Lind, R. et al., "The Network Vehicle—A Glimpse into the Future of Mobile Multi-Media," IEEE Aerospace and Electronic Systems Magazine, vol. 14, No. 9, Sep., 1999, pp. 29-32.

"Audio and Mobile MultiMedia Systems—Driving Tomorrow's Technology," published by Delphi Automotive Systems of Troy, Michigan, Oct. 1, 2000, pp. 1-19 and two additional pages.

C. Kenneth Orski, "Serving 'People in Motion'," available on the internet at http://www.nawgits.com/ko_pemot.html as of Feb. 9, 2005, three pages.

* cited by examiner

TELEMATICS APPLICATION FOR IMPLEMENTATION IN CONJUNCTION WITH A SATELLITE BROADCAST DELIVERY SYSTEM

BACKGROUND OF THE INVENTION

1. Field of the Invention

The present invention relates to the field systems and methods that allow for two-way telematics applications, where the term telematics refers to the transfer of data to and from a moving vehicle.

2. Discussion of Related Art

It is well known in the art to implement one-way broadcasting media. An example of such one-way broadcasting media is the one-way system employed by Sirius Satellite Radio of New York, N.Y.

One embodiment of a known one-way broadcasting media is the system 100 shown in FIG. 1. In the system 100, two or more satellites (not shown) are positioned in orbit about the Earth so that their antennae can receive and send communication signals 102 and 104. The two or more satellites form part of the satellite-air interface 106. The satellite-air interface 106 also includes terrestrial gap-fillers and intermediate transmitters required to augment the coverage of the digital signal 104 to the customer. The satellite-air interface 106 is connected to a ground station 108 that is connected to a number of information sources, such as schematically represented by the blocks 110, 112 labeled General Information, blocks 114, 116 labeled Internet, block 118 labeled Services, block 120 labeled Web Access and block 122 labeled Profile Databases. As explained below, the information sources in combination with the ground station 108 and the satellite-air interface 106 allow customers to receive SDARS (satellite digital audio radio system) broadcasts, initiate and/or cancel their subscription, conduct billing, and modify customer profiles.

For example, a customer having an appropriate radio receiver 124, receives one-way communication signals 104 from the satellites of the satellite-air interface 106. The radio receiver 124 includes an antenna and SDARS receiver (not shown) similar to elements 214 and 216 of FIG. 3 described below. Preferably, the radio receiver 124 will be installed in a vehicle and will be connected to a radio tuner inserted in the console of the vehicle. The radio tuner preferably will have buttons that will allow the user in the vehicle to select either AM, FM or satellite radio. The tuner allows the user to select as many as one hundred different channels of programming available from the satellite radio. In the case of the user selecting satellite radio, the radio receiver 124 checks the signal 104 to see if the user is a subscriber to the satellite radio package. This is possible because the radio receiver 124 has a unique electronic serial number (ESN) assigned to at the time of manufacture. The programs heard on a satellite radio channel will be audio in nature and preferably include music and audio text that identifies the music being heard. The programs may also include audio advertisements. The music, audio text and advertisements are gathered from the storage areas labeled as General Content in boxes 110, 112 shown in FIG. 1. The digital signal 104 is one-way in nature in that data flows from the satellite-air interface to the radio receiver 124 and not vice versa. Thus, the user/customer is unable to interact with the system 100 via the satellite interface 106. Instead, the customer would need to renew, initiate and/or cancel his or her radio satellite service by gaining access to the system 100 via an intranet site 114, an Internet site 116, a web site 120 or via contacting a services department 118 via telephone. The customer may also conduct billing and modify his or her personal profile through any of these access points as well.

Regarding the customer's personal profile, the system 100 can include a profile database 122 that contains information regarding each of its customers. The information can include the name, address, billing history of a customer and subscription status of customer.

One disadvantage of the above-described system is that it does not have a back-channel to allow interaction by the user/customer to the infrastructure of the system 100 via the satellite-air interface. This forces the customer to gain access to the system 100 outside the vehicle which can be inconvenient. In addition, many telematics services will not be available to a user/customer of system 100 without the use of a back-channel.

SUMMARY OF THE INVENTION

One aspect of the present invention regards a method of showing approval or disapproval of an item overheard on an audio system. The method includes sending an item via radio waves to an audio system, listening to the item on the audio system and activating a button to indicate approval or disapproval of the item.

A second aspect of the invention regards a method of unlocking a vehicle with a radio receiver that has a unique alpha-numeric identification name associated therewith. The method includes sending a first signal to a satellite digital audio radio system indicating that a vehicle with a receiver with a unique alpha-numeric identification name is locked, sending a radio signal from the satellite digital audio radio system to the receiver of the vehicle, wherein the radio signal is unique to the unique alpha-numeric identification name and unlocking the vehicle upon receipt of the radio signal by the receiver of the vehicle.

A third aspect of the present invention regards a method of performing location specific applications that includes sending a first signal to a satellite digital audio radio system from a vehicle requesting the performance of a location-specific application, sending information to the satellite digital audio radio system from the vehicle that represents a location of the vehicle at the time of sending the first signal. The method further includes determining the location of the vehicle and sending to the vehicle an answer to the location specific application based on the determining the location of the vehicle.

The first aspect of the present invention provides the advantage of providing customer feedback regarding various products and allowing advertisers and programmers to fine tune their advertisements and programming, respectively.

The second aspect of the present invention provides an easy and secure way for a driver to unlock his or her vehicle when the keys are accidentally left in the vehicle.

The third aspect of the present invention provides an improved way of determining a location specific application.

The present invention, together with attendant objects and advantages, will be best understood with reference to the detailed description below in connection with the attached drawings.

DETAILED DESCRIPTION OF THE INVENTION

Figure 1:
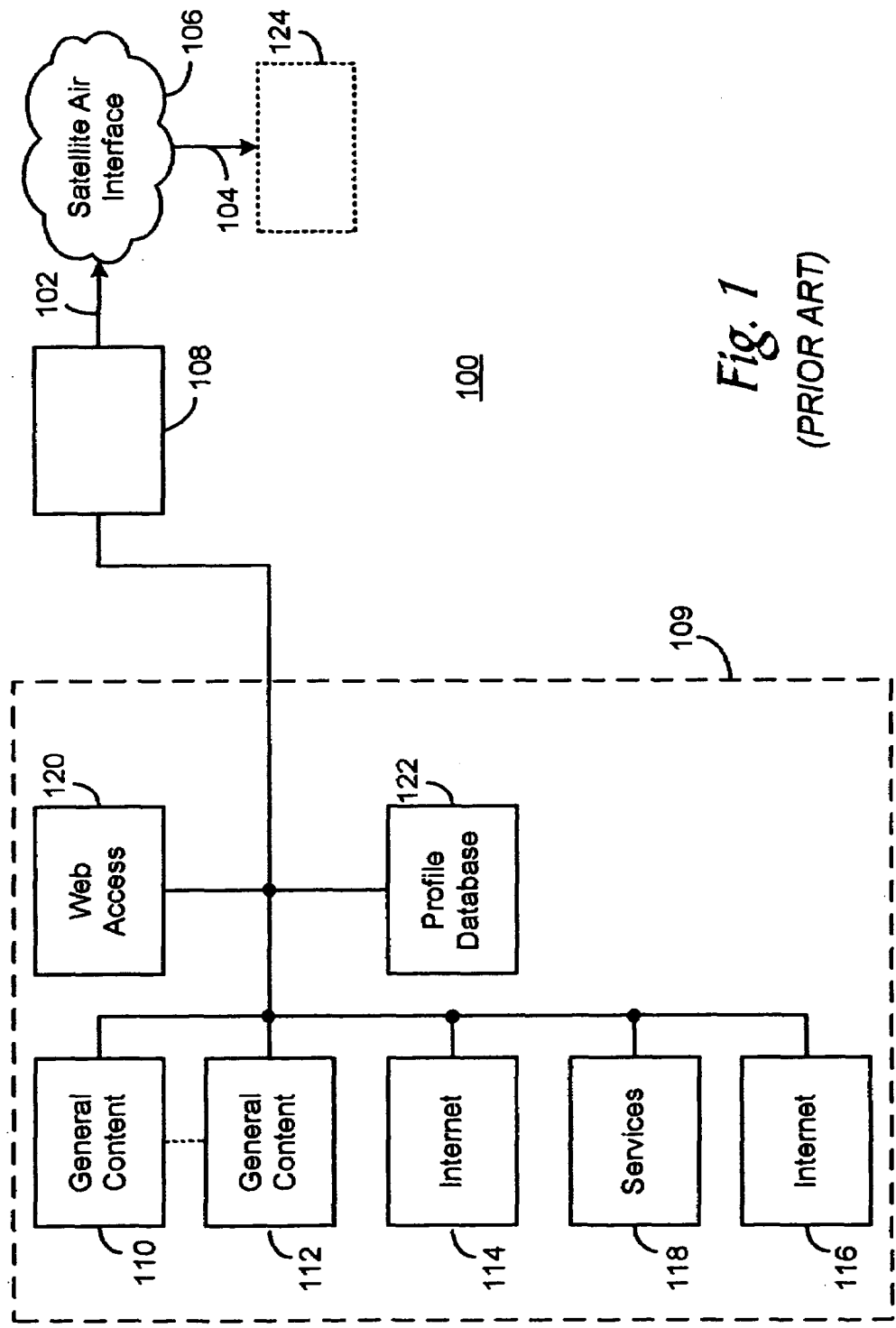
FIG. 1 schematically illustrates a known one way broadcasting media.
Figure 2:
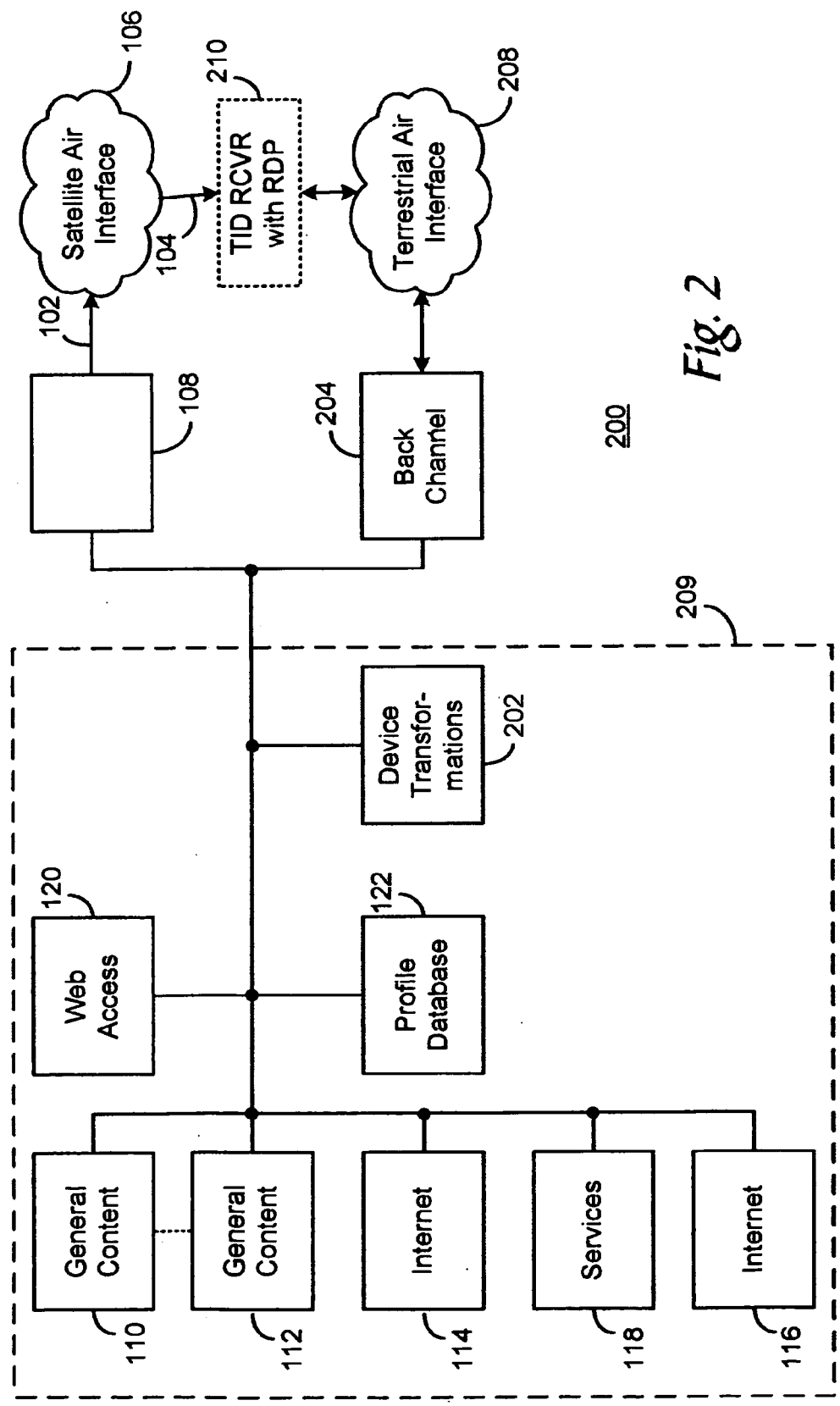
FIG. 2 schematically shows an embodiment of a two way telematics application according to the present invention.
Figure 3:
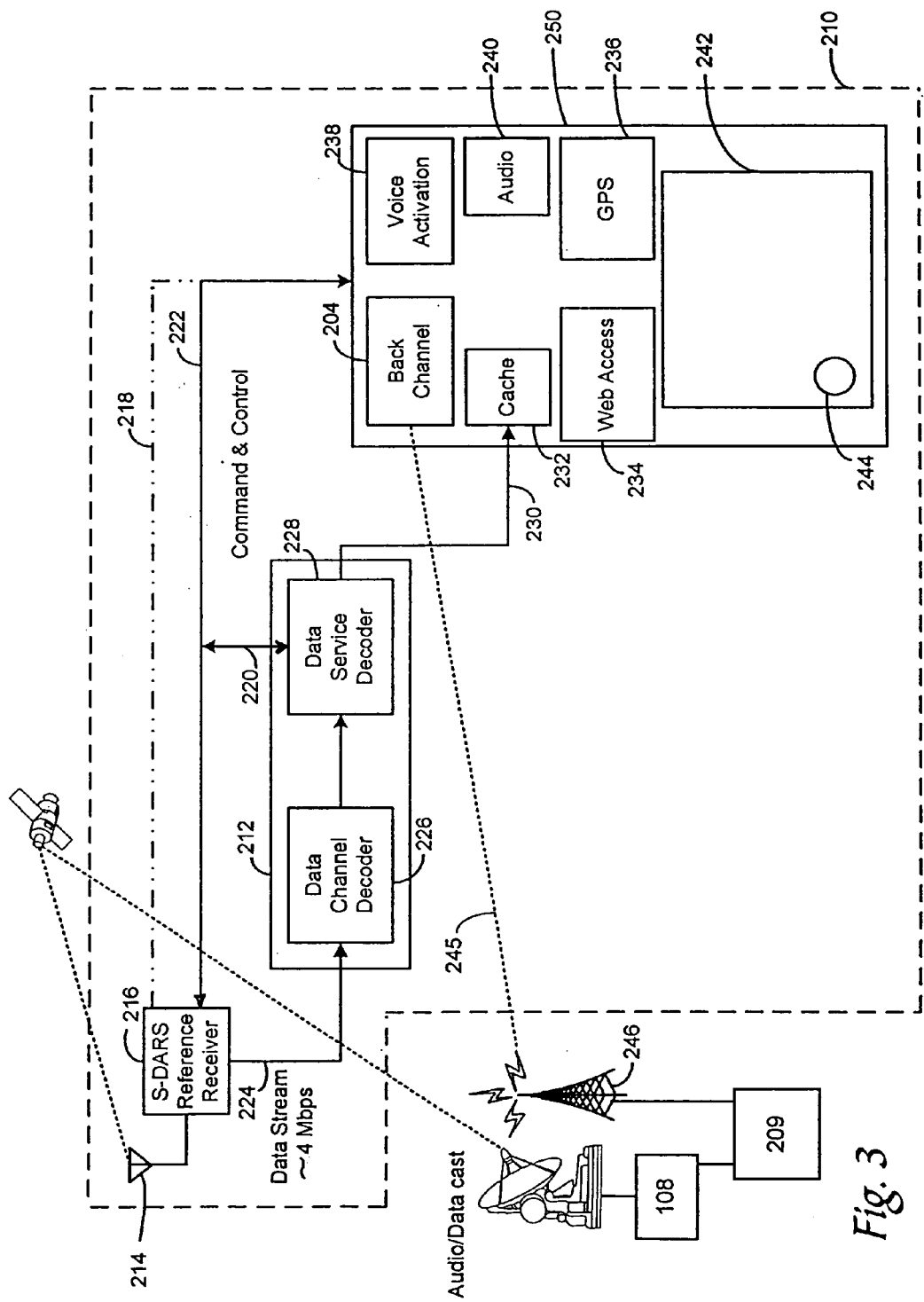
FIG. 3 schematically shows an embodiment of hardware to be used with the two way telematics application of FIG. 2 according to the present invention.

Referring to the drawings, FIGS. 2-3 show an embodiment of a system 200 that allows for two-way telematics applications. The system 200 adapts the one-way broadcasting system 100 of FIG. 1 and adds appropriate hardware, software, and services to support two-way telematics applications. Comparing systems 100 and 200 reveals several differences. One difference is that a device transformation system 202 is added. The device transformation system 202 formats telematics applications to support varying hardware platforms that are out in the field. The device transformation system 202 may be modified such that it can support multiple client-side hardware. For example, telematics applications that are originally designed to be presented on a PC-radio platform with a display could be formatted by the device transformation system 202 to optimize the display so that a telematics service could be rendered on a single line "British-flag" radio. An example of such a PC-radio platform is the platform that includes a color reconfigurable display made and sold under the trade name of ICES (Information Communication Entertainment and Safety) by Visteon of Dearborn, Mich. It is not expected that the differences between different hardware would be very great (e.g. you wouldn't need a unique one for each radio type, model, feature). Instead, there would be some general categories of devices such as monochrome, color, image-capable, text-only, etc so that the device transformation system 202 can operate on a wide range of hardware devices.

Another difference between system 200 and system 100 is that system 200 further includes a back channel infrastructure 204 that supports two-way communication back from the telematics interface device 210 that is contained within the dashed lines of FIG. 3. The back channel infrastructure 204 could either be a unique wireless interface owned by the service company or a leveraged existing service. For example, the back channel infrastructure 204 could be accomplished through the use of existing services such as the service sold by Bell South Wireless under the trade name RAM Mobile Data Service or through CDPD (Cellular Digital Pack Data) within a cellular phone service. In operation, the back channel infrastructure may take data that has come from the client and route it to the profile database 122 to confirm the customer's data request against his currently enabled services.

A third difference between the system 200 and the system 100 is that the system 200 includes a terrestrial air interface 208 that represents the actual air interface between the mobile client and the infrastructure 209. It is expected that this communication link will be highly asymmetrical in that the amount of data moving from the client to the backchannel 204 and to the infrastructure 209 will be very small and represent the requests for telematics services and/or applications. This is consistent with current Internet data flow from the user's perspective. Although the terrestrial air interface 208 is indicated as terrestrial, it is not limited to terrestrial-only and could be realized via a satellite back channel, should one be a viable solution.

A fourth difference between systems 100 and 200 is that the receiver 124 is modified so as to be a telematics interface device 210 which includes a telematics user control 250, an antenna 214 and an SDARS receiver 216. As shown in FIG. 3, the SDARS receiver 216 is connected with a receiver device partitioning system 212 that allows the customer to both receive data and broadcast information while interacting with the infrastructure to request specific data.

An embodiment of the telematics user control 250 and the receiver device partitioning system 212 is shown in FIG. 3. This diagram represents the physical hardware that must be implemented within the customer's mobile vehicle to enable the telematics features described in this application. As shown in FIG. 3, a satellite service delivers data at 2.3 GHz to an antenna 214 of the telematics interface device 210. The data is then delivered to an SDARS receiver or down link processor 216 that decodes noted that there are many well-known embodiments for the down link processor 216. The down link processor 216 generates left and right audio output signals 218 for use in the audio system 240 of the telematics user control 250. The signal 218 can be either analog or digital. The down link processor 216 receives command and control signals 220 and 222 from the receiver device partitioning system 212 and the telematics user control 250 of the telematics interface device 210, respectively. In addition, the down link processor 216 generates an output signal 224 that includes raw data stream (~4 Mbps) which also contains the additional telematics data which must be processed separately by the receiver device partitioning system 212 to provide this data to the user. As describe above, the down link processor 216 provides the primary SDARS functionality to the user in a one-way manner.

The receiver device partitioning system 212 extracts the telematics-specific data from the ~4 Mbps bit stream of output signal 224. The functionality of receiver device partitioning system 212 is broken down into two subfunction systems: a data channel decoder 226 and a data service decoder 228. The data channel decoder 226 conducts channel decoding on the data channels. The reasoning behind this is that data, being far more sensitive to errors that can corrupt the final result, must be encoded (and therefore decoded) with a much more powerful scheme than audio signals. A combination of channel-decoding and forward error correction optimizes the quality of the transfer of data while reducing the overhead.

The data services decoder 228 takes the raw, decoded telematics data and converts it to a format that is functionally usable for the telematics user control 250. For example, if the raw data represents an image for display, the data services decoder 228 applies the appropriate source decoding algorithms to take the data and presents it to the telematics user control 250 in an image file format for display.

As shown in FIG. 3, the data services decoder 228 generates a signal 230 that is delivered to a data cache 232 in the telematics user control 250. The data cache 232 receives the signal 230 in a streaming mode (or in the background while using another function). The telematics user control 250 also includes a web-access system 234, such as a micro-browser or a wireless application protocol feature, to engage the telematics options described below. The telematics user control 250 can also include a global positioning system 236 for location specific requests, and a voice activation system 238 to improve the interface between the customer and the service. The telematics user control 250 further includes the back-channel infrastructure 204 that supports two-way communication back from the telematics interface device 210.

The telematics user control 250 represents the telematics-enabled device in the vehicle with which a customer interacts. At the lowest level, this could be a radio or a remote human machine interface bezel providing buttons and display. The telematics user control 250 can provide both classical audio functionality (radio controls, volume control, channel choice, presets) and new telematics-enabled functions. Examples of products that could accomplish this include the products made and sold by Visteon of Dearborn, Mich. under the trade names of ICES mentioned previously or VNR, also known as Visteon Navigation Radio. These products provide the two critical functions, reconfigurable displays and buttons, and a communication back-channel.

Figure 4:
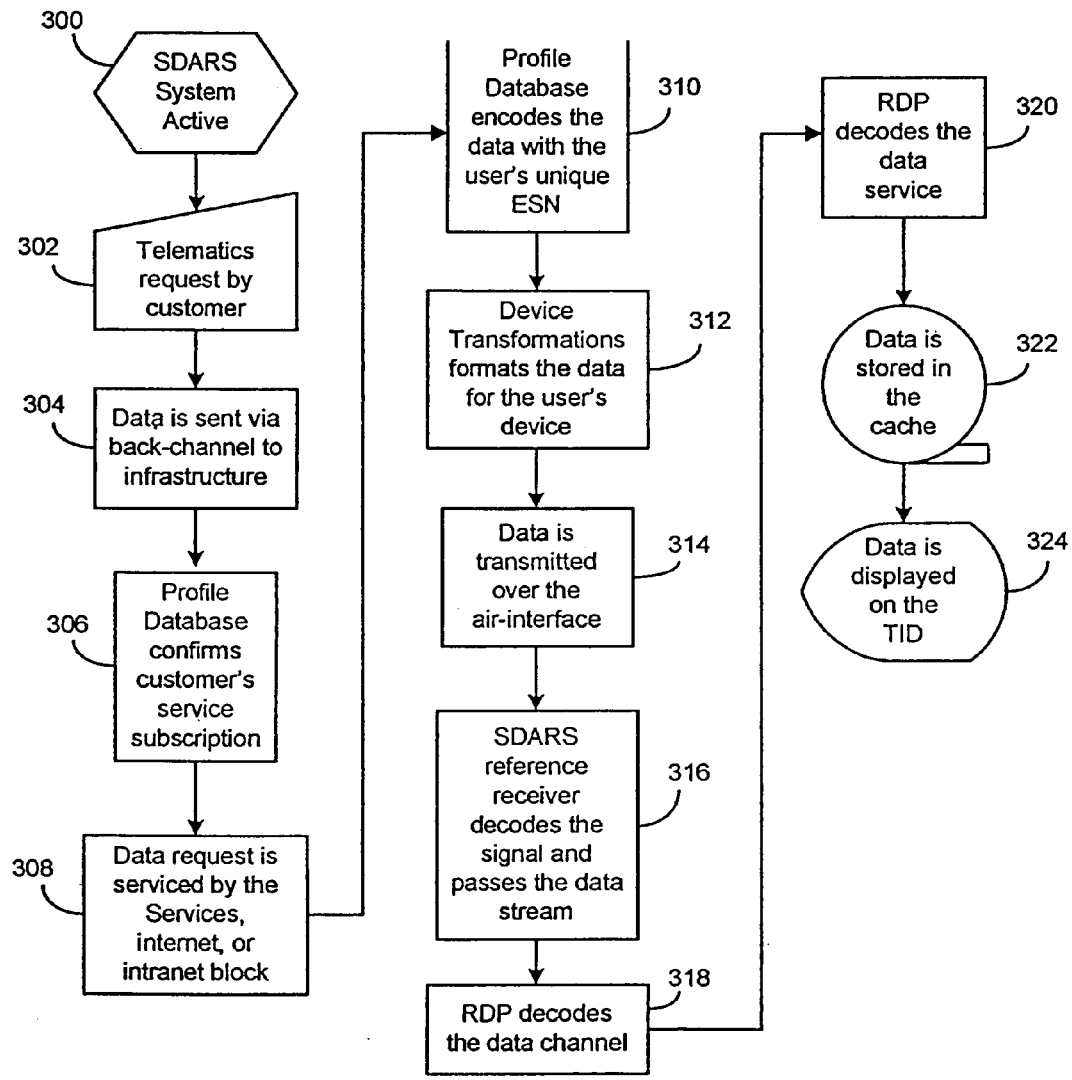
FIG. 4 shows a flow chart that shows a mode of communication flow in the two way telematics application of FIG. 2 according to the present invention.

With the above described architecture in mind, an example of the communication flow starting from a customer request for a telematics application to final delivery is shown in FIG. 4. In this example, the customer activates the SDARS system 200 by turning on the power of the telematics interface device 210 by turning on telematics user control 250 per step 300. Next, the customer requests a particular telematics application per step 302 by selecting the telematics application that is displayed on a menu of the telematics user control 250 of the interface device 210. Selection is accomplished by using buttons, mouse ball, pen or other well-known selection devices. After the particular telematics application is selected, data is sent via the back-channel infrastructure 204 to the information sources 110, 112, 114, 116, 118, 120 and 122 described previously per step 304. The data from the back-channel infrastructure 204 is sent to the profile database 122 that confirms whether or not the customer's service subscription is up-to-date per step 306. Assuming that the profile database 122 confirms that the customer is currently a subscriber, then the data request by the customer is serviced by the services information source 118, the Intranet information source 114 and the Internet information source 116 per step 308, depending on the telematics application selected by the customer. After the information sources 114, 116 and 118 are contacted and the desired data is retrieved, that data is encoded with the customer's unique ESN (electronic serial number) by the profile database 122 per step 310. Next, the encoded data is sent to the device transformation system 202 per step 312 which formats the encoded data for use with the customer's telematics interface device 210. Per step 314, the formatted and encoded data is then transmitted over the satellite-air interface 106 to the antenna 214 of the telematics interface device 210. The data is then delivered to the down link processor 216 that decodes the data and passes the data bit stream of output signal 224 to the receiver device partitioning system 212 per step 316. The data channel decoder 226 of the receiver device partitioning (RDP) system 212 then decodes the data channel of output signal 224 per step 318. Next, the data service decoder 228 decodes the data service per step 320. The data is then stored in the data cache 232 per step 322 and then the data is sent from the data cache 232 to the display of the telematics interface device 210 per step 324.

With the above process of FIG. 4 in mind, there are at least three telematics applications that could be implemented via the architecture of system 200. In one telematics application, the display 242 of the telematics user control 250 of the interface device 210 can include a "Buy Button" 244. In operation, a customer listens to an SDARS audio source. If the customer desires to purchase a song or album that he or she is presently listening to on the SDARS audio source, then the customer activates the "Buy Button" 244. Activation of the "Buy Button" will result in a signal 245 being generated in back-channel 204 that is sent to antenna 246 and to infrastructure 209. The signal 245 initiates a sales transaction and will derive credit card information and shipping information from the customer profile database 122 and results in the customer placing a purchase order for that particular song or album. In an alternative embodiment, pressing the "Buy Button" can result in formatted version of the song or album, such as MP3, being sent to the customer or a third party designated by the customer. The "Buy Button" 244 also can be used to purchase a product being promoted in an advertisement that is being currently heard by the SDARS audio source 240. In an alternative embodiment, the "Buy Button" 244 can be altered so that activating the button allows the customer to show his or her approval or disapproval of a song or album being currently listened to on the SDARS audio source 240 to improve programming content. Note that in each of the embodiments described above, activation of the "Buy Button" results in data flowing from the back-channel 204 to a radio tower 246 or the like which in turn sends the data to the infrastructure 209 of the system 200. The data is then sent to the services system 118 where the ordering of the song or album or the approval/disapproval vote is processed. The data could also be sent to the profile database 122 that records the order or vote.

A second possible telematics application that could be implemented via system 200 is to allow a customer access to his or her car when locked out of the car. This application takes advantage of the fact that each SDAR receiver 216 has a unique alpha-numeric name assigned to it known as an ESN (Electronic Serial Number) and so it is possible to access them separately. If the customer is locked out of his or her car, then the customer can use a touch-tone phone or a web interface to gain access to the SDARS infrastructure 209 by entering or providing a customer alpha-numeric name or identification number that indicates that the customer is currently enrolled for the system 200. Once the customer gains access to the system 200, he or she informs the system 200 that he or she is locked out of his or her vehicle. Next, the system 200, via a person or automatic answering system, will inform the customer that the request is being processed and that the vehicle will be unlocked within a certain period of time. The system 200 then sends a door-unlock command that is unique to the ESN of the SDAR receiver 216 of the locked vehicle to the telematics interface device 210 via satellite-air interface 106 which then passes the command to the customer's vehicle's multiplex network (not shown). Note that if the customer does not gain access to infrastructure 209 within a certain time period, dependent on specific vehicle shutdown and wake-up capabilities, then it will not be possible to unlock the vehicle via the telematics interface device 210.

A third possible telematics application is to allow the customer in his or her vehicle to perform location specific service applications. Two examples of location specific service applications are determining where the nearest gas station with respect to the vehicle is located or determining where the nearest traffic accident or traffic light failure is located with respect to the vehicle. In this embodiment, the global positioning system 236 allows the customer to request information regarding the nearest one of a certain type of commercial/public enterprise or event, such as the nearest gas station, post office, traffic light failure or traffic accident. The request and the global positioning information are then sent in a combined signal or separate signals via the back channel 204 to the infrastructure 209 via terrestrial antenna 246. Since the data sent to the infrastructure 209 includes both the request and the global positioning system location of the vehicle from the global positioning system 236, the infrastructure 209 interrogates its global position databases located at the general content 110, 112 or internet 116 databases and sends a location-specific answer to the telematics interface device 210 via satellite-air interface 106. Based on the location-specific answer, the customer can send another request to the infrastructure 209 via the back-channel 204 as to the most direct or best route to reach the location of the nearest commercial/public enterprise or the best route to avoid the location of the nearest event based on the vehicle's present position. The system 200 then sends an answer via the satellite-air interface 106.

The foregoing description is provided to illustrate the invention, and is not to be construed as a limitation. Numerous additions, substitutions and other changes can be made to the invention without departing from its scope as set forth in the appended claims.

We claim:

1. A two-way satellite digital audio radio system comprising:
   a ground station;
   an information source means for providing information connected to said ground station;
   a satellite in communication with said ground station;
   a vehicle comprising a telematics interface means for providing telematics applications;
   a satellite-air interface means for providing communication between said satellite and said telematics interface means;
   wherein said telematics interface means comprises a back-channel that is in communication with said information source independently of said satellite.

2. The system of claim 1, wherein said telematics interface means further comprises:
   an antenna that receives signals from said satellite air interface; and
   a receiver means for receiving signals from said antenna.

3. The system of claim 2, wherein said telematics interface means comprises a global positioning system for determining the location of said vehicle.

4. The system of claim 1, further comprising a transformation system to support varying hardware platforms.

5. The system of claim 1, further comprising a second interface means for allowing communication between said back channel and said information source.

6. The system of claim 1, wherein said telematics interface means further comprises a receiver device partitioning means that is connected with said receiver and for receiving digital data from said receiver and extracting telematics-specific data from said digital data.

7. The system of claim 1, wherein said telematics interface means comprises a button that when depressed allows the purchase of an item.

8. The system of claim 1, wherein said telematics interface means comprises a button that when depressed indicates a like or dislike of an item.

9. A two-way satellite digital audio radio system comprising:
   a ground station;
   an information source connected to said ground station;
   a satellite in communication with said ground station;
   a vehicle comprising a telematics interface device;
   a satellite-air interface that provides communication between said satellite and said telematics device;
   a transformation system to support varying hardware platforms; and
   wherein said telematics interface device comprises:
      a back-channel that is in communication with said information source independently of said satellite;
      an antenna that receives signals from said satellite air interface;
      a receiver that receives signals from said antenna;
      a receiver device partitioning system that is connected with said receiver and receives digital data from said receiver and extracts telematics-specific data from said digital data, wherein said receiver device partitioning system comprises:
         a data channel decoder that conducts channel decoding of said digital data; and
         a data service decoder that converts said digital data to a format that is functionally usable for said telematics interface device.

10. The system of claim 9, wherein said information source comprises a web site.

11. The system of claim 9, wherein said information source comprises a profile database.

12. The system of claim 9, wherein said information source comprises recorded music.

13. The system of claim 9, wherein said telematics interface device comprises a button that when depressed indicates a like or dislike of an item.

14. A two-way satellite digital audio radio system comprising:
   a ground station;
   an information source connected to said ground station;
   a satellite in communication with said ground station;
   a vehicle comprising a telematics interface device;
   a satellite-air interface that provides communication between said satellite and said telematics device;
   wherein said telematics interface device comprises:
      a back-channel that is in communication with said information source independently of said satellite;
      an antenna that receives signals from said satellite air interface;
      a receiver that receives signals from said antenna;
      a receiver device partitioning system that is connected with said receiver and receives digital data from said receiver and extracts telematics-specific data from said digital data, wherein said receiver device partitioning system comprises:
         a data channel decoder that conducts channel decoding of said digital data; and
         a data service decoder that converts said decoded digital data to a format that is functionally usable for said telematics interface device.

15. The system of claim 14, wherein said information source comprises a web site.

16. The system of claim 14, wherein said information source comprises a profile database.

17. The system of claim 14, wherein said information source comprises recorded music.

18. The system of claim 14, wherein said telematics interface device comprises a button that when depressed indicates a like or dislike of an item.

* * * * *